(12) United States Patent
Peleg et al.

(10) Patent No.: US 7,006,124 B2
(45) Date of Patent: *Feb. 28, 2006

(54) GENERALIZED PANORAMIC MOSAIC

(75) Inventors: Shmuel Peleg, Mevaseret Zion (IL); Benny Rousso, Bat-Yam (IL)

(73) Assignee: Yissum Research Development Company of the Hebrew University of Jerusalem, Jerusalem (IL)

( * ) Notice: Subject to any disclaimer, the term of this patent is extended or adjusted under 35 U.S.C. 154(b) by 399 days.

This patent is subject to a terminal disclaimer.

(21) Appl. No.: 10/244,286

(22) Filed: Sep. 16, 2002

(65) Prior Publication Data

US 2003/0076406 A1    Apr. 24, 2003

Related U.S. Application Data

(63) Continuation of application No. 09/355,048, filed as application No. PCT/IL98/00026 on Jan. 20, 1998, now Pat. No. 6,532,036.

(60) Provisional application No. 60/036,571, filed on Jan. 30, 1997.

(51) Int. Cl.
*H04N 7/00* (2006.01)

(52) U.S. Cl. ...................................................... 348/36
(58) Field of Classification Search ................ 348/395, 348/384, 394, 401, 403, 404, 405, 425, 430, 348/420; 382/236, 232, 240, 238
See application file for complete search history.

(56) References Cited

U.S. PATENT DOCUMENTS

| | | | |
|---|---|---|---|
| 5,130,794 A | 7/1992 | Ritchey | 358/87 |
| 5,455,689 A * | 10/1995 | Taylor et al. | 358/450 |
| 5,481,479 A | 1/1996 | Wight et al. | 364/525 |
| 5,768,447 A | 6/1998 | Irani et al. | 382/305 |
| 5,862,508 A | 1/1999 | Nagaya et al. | 701/207 |
| 5,936,615 A * | 8/1999 | Waters | 345/173 |
| 5,991,444 A | 11/1999 | Burt et al. | 382/232 |
| 5,995,095 A | 11/1999 | Ratakonda | 345/328 |
| 6,078,701 A | 6/2000 | Hsu et al. | 382/294 |
| 6,532,036 B1 * | 3/2003 | Peleg et al. | 348/36 |

OTHER PUBLICATIONS

Laura Teodosio and Walter Bender, Salient Video Still, MIT Media Laboratory, Aug. 1993, pp. 1-7.*
Teodosio, L. Et Al "Salient Video Stills: Content and Context Preserved." Proceedings of First ACM International Conference on Multimedia (1993) pp 39-46.

(Continued)

*Primary Examiner*—Vu Le
*Assistant Examiner*—Behrooz Senfi
(74) *Attorney, Agent, or Firm*—Ladas & Parry LLP

(57) ABSTRACT

Video mosaicing is commonly used to increase the visual field of view by pasting together many video frames. The invention provides for image mosaicing for general camera motion, including forward camera motion and zoom. After computing the motion between the images in a sequence, strips are selected from individual frames such that the strips are approximately perpendicular to the optical flow. The strips are warped such that the optical flow becomes parallel, and are pasted to a panoramic mosaic. The warping transformation on the strips, which results in making the optical flow to be parallel, can be modeled by an oblique projection of the image onto a cylindrical surface whose central axis is the trajectory of the camera. In addition, this invention uses view interpolation to generate dense intermediate views between original video frames, such that these intermediate views are used to overcome effects of motion parallax when creating panoramic mosaics.

11 Claims, 11 Drawing Sheets

OTHER PUBLICATIONS

Sawhney, H.S. Et Al "Model-based 2D & 3D Dominant Motion Estimation . . . " IEEE, (1995) pp 583-590.

Pankaj, D. Et Al "Automated Assembling of Images: Image Montage Preparation." Pattern Recognition, vol. 28, No. 3, (1995) pp 431-445.

Hanna, K.J. Et Al "Combining Stereo and Motion Analysis for Direct Estimation of Scene Structure." (1993) IEEE, pp 357-365.

Sawhney, H.S. "Motion Video Analysis Using Planar Parallax." SPIE. vol. 2185 (1994) pp 231-242.

Shashua, A. Et Al "Relative Affine Structure: Canonical Model for 3D from 2D Geometry and Applications." IEEE, vol. 18, No. 9 (1996) pp 873-883.

Chen, S.E. Et Al "View Interpolation for Image Synthesis." SIGGRAPH, (1993) pp 279-288.

Irani, M. Et Al "Mosaic Based Representations of Video Sequences and Their Applications." IEEE, (1995) pp 605-611.

Jaillon, P. Et Al "Image Mosaicking Applied to Three-Dimensional Surfaces." IEEE, (1994) pp 253-257.

McMillan, L. Et Al "Plenoptic Modeling: An Image-Based Rendering System." SIGGRAPH (1995) pp 1-8.

Sawhney, H.S. Et Al "Model-Based 2D & 3D Dominant Motion Estimation for Mosaicing and Video Representation." IEEE, (1995) pp 583-590.

Seitz, S.M. Et Al "Physically-Valid View Synthesis by Image Interpolation." IEEE, (1995) pp 1-8.

Zheng, J.Y. et al. "Panoramic Representation for Route Recognition by a Mobile Robot." International Journal of Computer Vision, vol. 9 (1992) pp. 57-76.

Szeliski, R. "Video Mosaics for Virtual Envirnoments." IEEE (1996) pp 22-30.

Laura Teodosio and Walter Bender, Salient Video Stills, MIT Media Laboratory, pp. 1-7.

* cited by examiner

GENERALIZED PANORAMIC MOSAIC

This application is a continuation of Ser. No. 09/355,048 filed Sep. 15, 1999 now U.S. Pat. No. 6,532,036 which is a 371 of PCT/IL98/00026 filed Jan. 20, 1998 which claims benefit to provisional application 60/036,571 filed Jan. 30, 1997,

FIELD OF THE INVENTION

This invention relates to video image mosaicing for obtaining panoramic mosaics of a scene.

PRIOR ART

Prior art references considered to be relevant as a background to the invention are listed below. Acknowledgement of the references herein shall not be inferred as meaning that these are in any way relevant to the patentability of the invention disclosed herein. Each reference by a number enclosed in square brackets and accordingly the prior art will be referred to throughout the specification by numbers enclosed in square brackets.

[1] *ARPA Image Understanding Workshop*, Monterey, Calif., November 1994, Morgan Kaufmann.
[2] *Fifth International Conference on Computer Vision*, Cambridge, Mass., June 1995, IEEE-CS.
[3] *IEEE Conference on Computer Vision and Pattern Recognition*, San Francisco, Calif., June 1996.
[4] P. J. Burt and E. H. Adelson. A multiresolution spline with application to image mosaics. *ACM Trans. on Graphics,* 2(4), pages 217–236, October 1983.
[5] P. J. Burt and P. Anandan. Image stabilization by registration to a reference mosaic. In *ARPA Image Understanding Workshop [1]*, pages 425–434.
[6] S. E. Chen and L. Williams. View interpolation for image synthesis. In *SIGGRAPH*, pages 279–288, Anaheim, Calif., August 1993, ACM.
[7] T. R. Halfhill. See you around. *Byte Magazine*, pages 85–90, May 1995.
[8] M. Hansen, P. Anandan, K. Dana, G. van der Wal, and P. J. Burt. Real-time scene stabilization and mosaic construction. In *ARPA Image Understanding Workshop [1]*, pages 457–465.
[9] M. Irani, P. Anandan, and S. Hsu. Mosaic based representations of video sequences and their applications. In *Fifth International Conference on Computer Vision [2]*, page 605–611.
[10] P. Jaillon and A. Montanvert. Image mosaicing applied to three-dimensional surfaces. In 12 *International Conference on Pattern Recognition*, pages 253–257, Jerusalem, Israel, October 1994, IEEE-CS.
[11] A. Krishnan and N. Ahuja. Panoramic image acquisition. In *IEEE Conference on Computer Vision and Pattern Recognition [3]*, pages 379–384.
[12] S. Mann and R. Picard. Virtual bellows: Constructing high quality stills from video. In *First IEEE International Conference on Image Processing*, Austin, Tex., November 1994.
[13] L. McMillan and G. Bishop. Plenoptic modeling: An image-based rendering system. In *SIGGRAPH*, Los Angeles, Calif., August 1995, ACM.
[14] D. L. Milgram. Computer methods for creating photomosaics. *IEEE Trans. on Computers*, C-24, pages 1113–1119, 1975.
[15] D. L. Milgram. Adaptive techniques for photomosaicing. *IEEE Trans. on Computers*, C-26, pages 1175–1180, 1977.
[16] S. Peleg, Elimination of seams from photomosaics. *Computer Graphics and Image Processing,* 16, pages 90–94, May 1981.
[17] B. Rousso, S. Avidan, A. Shashua, and S. Peleg. Robust recovery of camera rotation from three frames. In *IEEE Conference on Computer Vision and Pattern Recognition [3]*, pages 796–802.
[18] H. S. Sawhney, S. Ayer, and M. Gorkani. Model-based 2D and 3D dominant motion estimation for mosaicing and video representation. In *Fifth International Conference on Computer Vision [2]*, pages 583–590.
[19] S. Seitz and C. Dyer. Physically valid view synthesis by image interpolation. In *Proc. IEEE Workshop on Representation of Visual Scenes*, Cambridge, Mass., June 1995, IEEE-CS.
[20] R. Hartley and R. Gupta. Linear pushbroom cameras. In J. O. Eklundt, editor, *Third European Conference on Computer Vision*, pages 555–566, Stockholm, Sweden, May 1994, Springer.
[21] M. Irani, B. Rousso, and S. Peleg. Detecting and tracking multiple moving objects using temporal integration. In G. Sandini, editor, *Second European Conference on Computer Vision*, pages 282–287, Santa Margherita, Italy, May 1992, Springer.
[23] R. Szeliski. Video mosaics for video environments. *IEEE Computer Graphics and Applications*, pages 22–30, March 1996.
[24] R. Szeliski and S. B. Kang. Direct methods for visual scene reconstruction. In *Proc. IEEE Workshop on Representation of Visual Scenes*, Cambridge, Mass., June 1995. IEEE-CS, pages 26–33.
[25] J. Y. Zheng and S. Tsuji. Panoramic representation for route recognition by a mobile robot. International Journal of Computer Vision, Vol. 9, pages 55–76, 1992.
[26] L. Teodosio and W. Bender. Salierat video stills: content and context preserved. Proceedings of the ACM Multimedia Conference, Anaheim, August, 1993, pages 39–46.

BACKGROUND OF THE INVENTION

The need to combine pictures into panoramic mosaics existed since the beginning of photography, since the camera's field of view is always smaller than the human field of view. Also, very often large objects cannot be captured in a single picture, and only photo-mosaicing enables a more complete view. Digital photography created new applications for mosaicing [14, 15, 16, 4, 24, 23], which were first implemented for aerial and satellite images.

Three major issues are important in traditional image mosaicing:

(i) Image alignment, which determines the transformation that aligns the images to be combined into a mosaic. Paper photo-mosaicing uses rigid transformations for alignment: picture translations (shifts) and rotations. Digital processing enables more general transformations, like affine or planar-projective.

(ii) Image cut and paste is necessary since most regions is in the panoramic mosaic are overlapping, and are covered by more than one picture. The cut and paste process involves either a selection of a single image for each overlapping region, or some kind of a combination of all overlapping images.

(iii) Image blending is necessary to overcome the intensity difference between images, differences that are present even when images are perfectly aligned. Such differences are created by a dynamically changing camera gain.

The simplest mosaics are created from a set of images whose mutual displacements are pure image-plane translations. This is approximately the case with some satellite images. Such translations can either be computed by manually pointing to corresponding points, or by image correlation methods. Other simple mosaics are created by rotating the camera around its optical center using a special device, and creating a panoramic image which represents the projection of the scene onto a cylinder [7, 11, 12, 13] or a sphere. Since it is not simple to ensure a pure rotation around the optical center, such mosaics can be used only in limited cases.

In more general camera motions, which may include both camera translations and camera rotations, more general transformations for image alignment are used [5, 8, 9, 10, 18]. In most cases images are aligned pairwise, using a parametric transformation like an affine transformation or planar-projective transformation (see, for example, [26]). These transformations include an intrinsic assumption regarding the structure of the scene, such as being planar. A reference frame is selected, and all images are aligned with this reference frame and combined to create the panoramic mosaic. These methods are therefore referred to as reference frame based methods.

Aligning all frames to a single reference frame is reasonable when the camera is far away and its motion is mainly a sideways translation and a rotation around the optical axis. Significant distortions are created when camera motions include other rotations. FIG. 1 shows the effects of large rotations on reference frame based methods. The objects a, b, x, y, c, d, w, z are viewed from two cameras $C_1$ and $C_2$. The image $I_1$ is selected to be a reference frame and image $I_2$ is projected onto that reference frame. Large rotations generate distortions when projecting on the reference frame, and the information derived from frames with such rotations is blurred, and almost useless. Moreover, in long sequences in which the camera is traveling in a complex path, one frame can not be used for long as a reference frame, and projection of the entire sequence onto that frame becomes impractical.

The manifold projection method was introduced in [25], where a mosaic is constructed by scanning a scene with a one-dimensional, straight array.

However, none of the above methods can handle cases where images cannot be aligned due to parallax, or cases of zoom and forward motion.

Manifold Projection simulates the sweeping of a scene using a linear one-dimensional sensor array, see FIG. 2. Such a one-dimensional sensor can scan the scene by arbitrary combinations of rotations and translations, and in all cases the scanning will result in a sensible panoramic image if it could be figured out how to align the incoming one-dimensional image strips. Some satellite images are created by scanning the earth with a one-dimensional sensor array using a rotating mirror. Since in this case the alignment of the sensors can be done using the location of the satellite and the position of the mirror, panoramic two-dimensional images are easily obtained. FIG. 2 shows aerial photography with a linear one-dimensional scan system.

In more general cases the motion of the sweeping plane may not be known. It seems impossible to align the one-dimensional image strips coming from an arbitrary plane sweep, but the problem becomes easier when the input is a video sequence. A two-dimensional frame in a video sequence can be regarded as having a one-dimensional strip somewhere in the center of the image ("center strip"), embedded in the two-dimensional image to facilitate alignment. The motion of the sweeping plane can then be computed from the entire image, and applied on the center-strip for alignment and mosaicing.

The image transformations of the one-dimensional strips generated by the sweeping plane are only rigid transformations: image plane translations and rotations. Therefore, rigid transformations are also the transformations used in manifold projection. It should be noted that general camera motions induce, in general, non-rigid image-plane transformations. However, to simulate the plane sweep only rigid transformations are used for the center-strip.

The panoramic mosaic generated by combining the aligned one-dimensional center-strips forms the manifold projection. This is a projection of the scene into a general manifold, which is a smooth manifold passing through the centers of all image planes constructing the mosaic. In the case of pure camera translations (FIG. 3a), manifold projections turn out to be a parallel projection onto a plane. In the case of pure camera rotations (FIG. 3b), it is a projection onto a cylinder, whose principal axis is the rotation axis. But when both camera translations and rotations are involved, as in FIG. 3c, the manifold is not a simple manifold any more. In FIGS. 3a, 3b and 3c the camera is located at the tip of the "field-of-view" cone, and the image plane is marked by a solid segment. The ability to handle such arbitrary combinations of camera rotations and translations is the major distinction between manifold projection and all previous mosaicing approaches.

In view of the foregoing, it should be apparent that there exists a need to provide a method for the creation of panoramic image mosaics in cases not treated in the prior art. Such cases involve camera translations with image parallax; forward motion; camera motions that are combinations of translations and rotations; and camera zoom.

SUMMARY OF THE INVENTION

It is important to note that whenever the terms "video", "movie", "frame", "picture", or "image" are used, they refer to any representation of a picture or a movie (motion picture). A still picture can be recorded on film by a traditional camera, by a digital camera, by a scanner, or any other device that records still images. A video (or a motion picture) can be recorded by a film camera, an analog or a digital videotape, or any other device that records motion pictures. The area of image mosaicing in general, and this invention in particular, is applicable to all forms of images which can be manipulated by appropriate devices, whether mechanical, optical, digital, or any other technology.

Panoramic mosaics are constructed by combining strips from the image sequence. In accordance with the present invention, the shape, size and position of the strips are determined for each image in accordance with the type of camera motion. The strips are cut from the images, and pasted into the panoramic mosaic after being transformed, such that the resulting mosaic remains continuous.

In accordance with the present invention, the following constraints are preferably (but not necessarily) used in order to deal with general image plane transformations:

(a) the strips should be approximately perpendicular to the optical flow.

(b) the strips collected for pasting should be warped before pasting into the panoramic image so that after warping their original optical flow, it becomes approximately parallel to the direction in which the panoramic image is constructed.

Under these conditions, cases of zoom and forward motion can be handled as well as the other simple cases. For example, in the case of zoom or forward motion, these properties enable cutting circular strips, and proper bending of them before pasting into the panoramic image.

This invention also describes how to determine the width of the strips. For example, in order to handle image parallax properly, the size of the strips can be determined from the camera's three-dimensional motion, as can be computed from the sequence itself, or as can be measured by external devices.

To enable smooth mosaics even when frames to be combined are taken from different viewpoints, and have substantial parallax, views can be synthesized for in-between camera positions. For smoothest mosaics the number of in-between camera positions is selected such that the strip is narrow, e.g. having a width of a single pixel.

The present invention provides for a method for combining a sequence of two dimensional images of a scene to obtain a panoramic mosaic of said scene, said sequence of two-dimensional images being acquired by a moving camera in relative motion with respect to said scene, said camera having an optical center, the camera motion giving rise to optical flow between the images, the method comprising the step of warping the images;

pasting the images into the panoramic image, such that the optical flow becomes substantially parallel to the direction in which the mosaic is constructed.

The invention still further provides for combining a sequence of two-dimensional images of a scene to obtain a panoramic mosaic of said scene, said sequence of two-dimensional images being acquired by a moving camera in relative motion with respect to said scene, said camera having an optical center, the camera motion giving rise to optical flow between the images, the method comprising the steps of:

(a) selecting for each image of said sequence at least one non-straight strip such that each strip is substantially perpendicular to said optical flow; said non-straight strips having a front edge and a back edge with the optical flow entering a strip through the front edge and exiting the strip through the back edge; and (b) pasting together said strips from adjacent to construct a panoramic mosaic.

By one embodiment the method further comprises the step of:

(a') warping the front edge of a strip defined on a two-dimensional so that it is substantially aligned with the back edge of a step defined on an adjacent two-dimensional image.

By another embodiment the strips are transformed by warp into strips having edges of arbitrary shape before the strips are pasted together.

By yet another embodiment the strips are transformed by warping into strips having straight edges before the strips are combined together.

According to yet another embodiment the two-dimensional images are related by an affine transformation or by a planar-projective transformation.

According to another embodiment said images are projected onto a three-dimensional cylinder whose major axis approximates the path of the camera centers of said images, the combination of the strips is achieved by translating the projected two-dimensional images substantially along the cylindrical surface of the three-dimensional cylinder.

According to yet another embodiment every two subsequent images define their own cylinder whose major axis substantially passes through the centers of the cameras of said images, and the cylinders are concatenated substantially along the image sequence.

According to still another embodiment a transformation is applied to the panoramic mosaic depending on a desired viewpoint.

According to a further embodiment wherein the sequence of images is augmented by sets of interpolated images intermediate to the images of the sequence of images, and wherein the strips are augmented with strips defined on the interpolated images.

According to another embodiment the system further combines a sequence of two-dimensional images of a scene to obtain a panoramic mosaic of said scene, said sequence of two-dimensional images being acquired by a moving camera in relative motion with respect to said scene, said camera having an optical center, the camera motion giving rise to optical flow between the images, the system comprising:

warper for warping the images;

paster for pasting the images into the panoramic image, such that the optical flow becomes substantially parallel to the direction in which the mosaic is constructed.

Still further, the invention provides for combining a sequence of two-dimensional images of a scene to obtain a panoramic mosaic of said scene, said sequence of two-dimensional images being acquired by a moving camera in relative motion with respect to said scene, said camera having an optical center, the camera motion giving rise to optical flow between the images, the system comprising:

(a) selector for selecting for each image of said sequence at least one strip such that each strip is substantially perpendicular to said optical flow; said strips having a front edge and a back edge with the optical flow entering a strip through the front edge and exiting the strip through the back edge; and (b) paster for pasting together said strips from adjacent images in such a way that the front edge of a strip defined on an image is substantially aligned with the back edge of a strip defined on an adjacent image.

Still yet further the invention provides a memory containing a file representing a panoramic mosaic of a scene.

The process described herein can alternatively be interpreted using three-dimensional projections of the images onto cylinders ("pipes") whose principal axis is the direction of camera motion. Such projections create warpings of the images such that the optical flow becomes parallel.

BRIEF DESCRIPTION OF THE DRAWINGS

For a better understanding the invention will now be described, by way of example only, with reference to the accompanying drawings in which:

FIG. 9 show the shape of strips for different cases of affine motion:

FIGS. 10a–c shows strips that are perpendicular to the optical flow. Line F2 is selected in Image I2 and Line F3 is selected in Image I3. The mapping is of Line F3 (in I3) into Image I2 using the same affine transformation is Line F3'. The strip S2 taken from Image I2 is bound between lines F2 and F3';

FIG. 10d shows strips that are warped and pasted so that the optical flow becomes parallel, their back is fixed (e.g. F2 in strip S2) and their front (e.g. F3' in strip S2) is warped to match the back of the next strip;

DETAILED DESCRIPTION OF THE INVENTION

Figure 1:
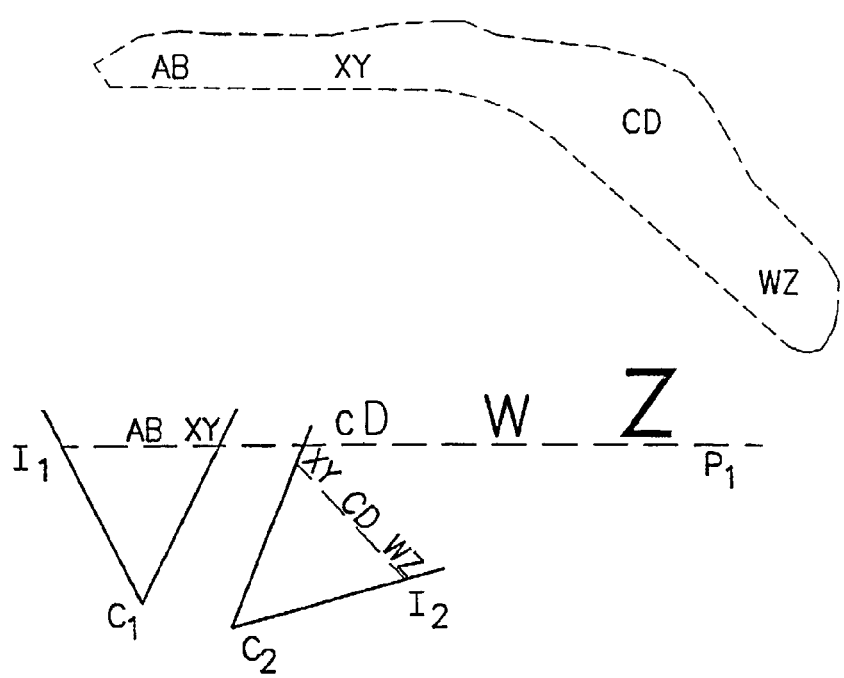
FIG. 1 shows the effects of large rotations on reference frame based methods.
Figure 2:
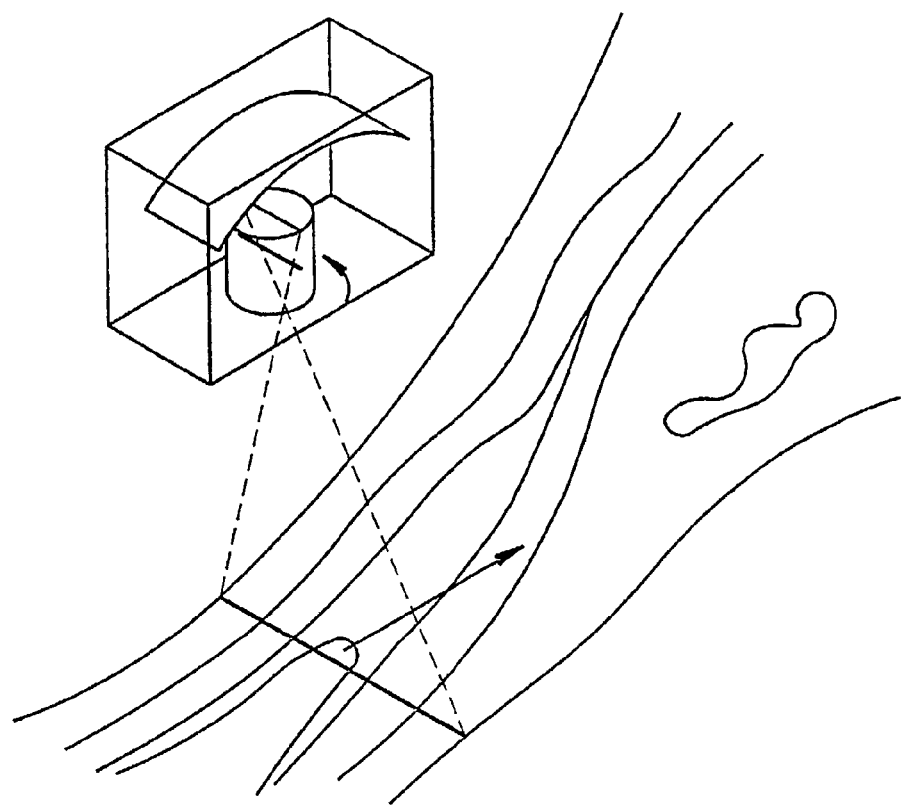
FIG. 2 shows aerial photography with a one-dimensional scan system.
Figure 3A:
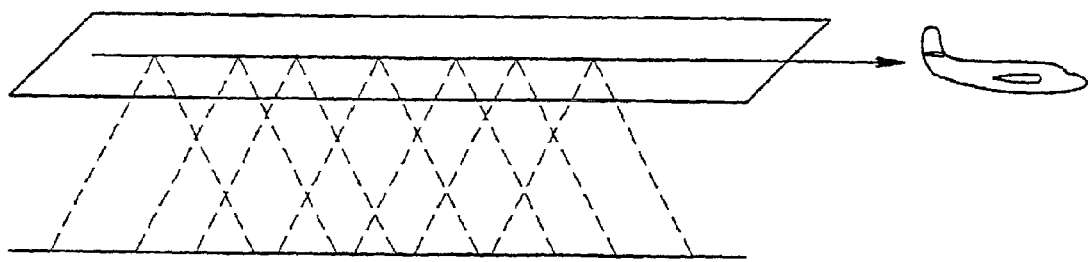
FIG. 3a shows manifold projection for a camera performing pure translation, the projection is a parallel projection onto a plane.
Figure 3B:
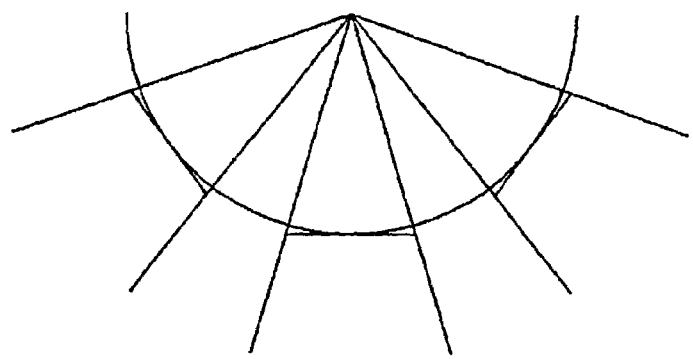
FIG. 3b shows manifold projection for a camera performing pure rotation, the projection is onto a cylindrical manifold.
Figure 3C:
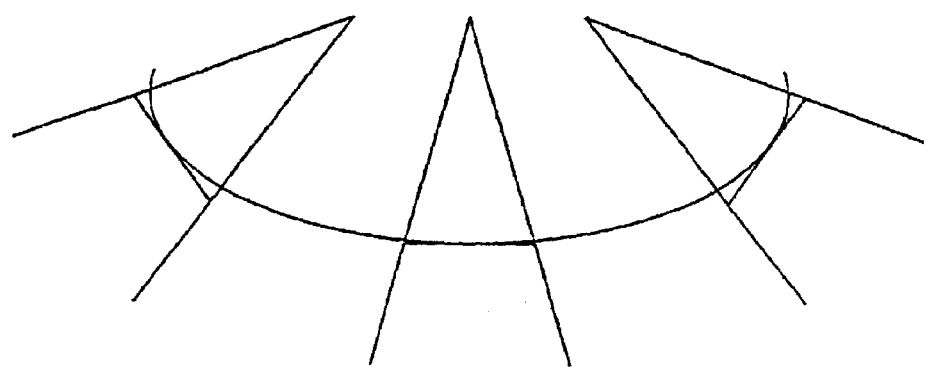
FIG. 3c shows manifold projection for a camera performing both translation and rotation, the projection is onto a manifold not having a simple geometrical form.
Figure 4:
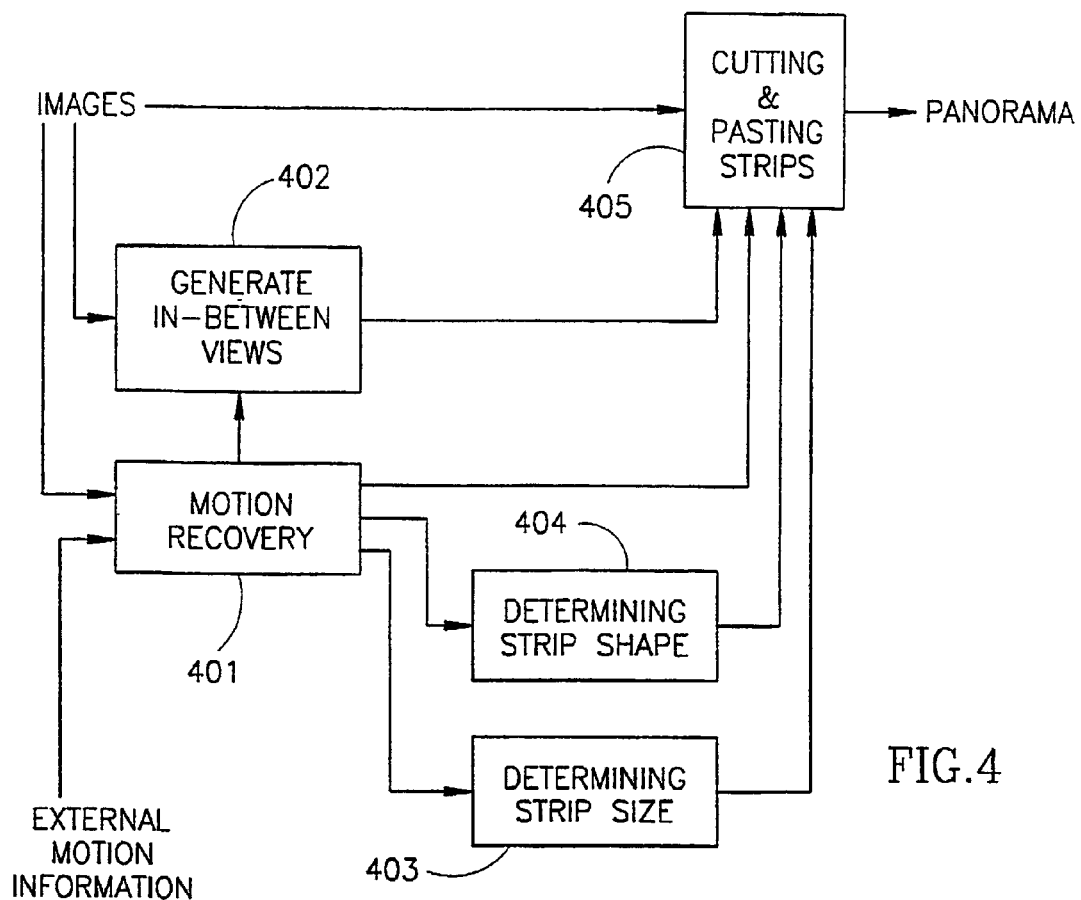
FIG. 4 shows a general flow chart of the principle steps of the panorama production process of the invention.

Attention is first drawn to FIG. 4 showing a general flow chart of the principle steps of the panorama production process of the invention. Motion recovery is performed at step 401. This step can use the images as well as any external motion information. New views synthesis is performed at step 402. This step can use the input images, and motion information. Determining the strip size is performed at step 403. This step can also use the motion information. Determining the strip shape is performed at step 404. The cut and paste process is performed at step 405. This step can use the input images, the synthetic images for the intermediate views, the motion information, the strip size, and the strip shape. The result of this process is a realistic panorama. Steps 402, 403, and 404 are optional, and incorporating any of these steps is a process covered by this invention.

A detailed example of the method of the present invention will be given and applied to the very common case, in which the motion between every two successive images can be modeled as a two-dimensional affine motion. This covers most simple scenarios, and also zoom and forward motion in cases of planar scene, parallel to the image plane. Generated mosaics have minimal distortions compared to the original images, as no global scaling is performed.

A possible geometric interpretation of the method of the invention will be given for general camera translation. This is done using a projection we call Pipe Projection. This Pipe projection can be used as an implementation of the proposed method when three-dimensional camera motion can be recovered. This interpretation of the method demonstrates the way strips can be collected and transformed, in such a way that complicated cases of oblique view can still be handled well by the proposed method.

The suggested three-dimensional interpretation of the method is that images in a video sequence are transformed by an oblique projection of the image onto a viewing pipe whose central axis is defined by the trajectory of the camera. After this transformation the optical flow between frames becomes parallel, and the frames can be easily mosaiced along the viewing pipe, using simple cut and paste. The pipe mosaic generated this way includes most of the details observed by the moving camera, where each region is taken from that image where it was captured at highest resolution. Viewing this pipe mosaic from various directions can give equivalent results to the various mosaics achieved using two-dimensional implementation.

Shape of Strips

With no parallax and with pure image translation the construction of the panorama from the images is simple. Since over an overlap area between two images the alignment is very good, any selection of the particular image that will cover any given region is usually not critical. The shape of the strip becomes important in cases without parallax mostly with image magnification like in the case of zoom. But with image parallax, alignment over an overlap area between images will not be perfect, and the selection of which image will cover an area in the panorama becomes critical.

Figure 5:
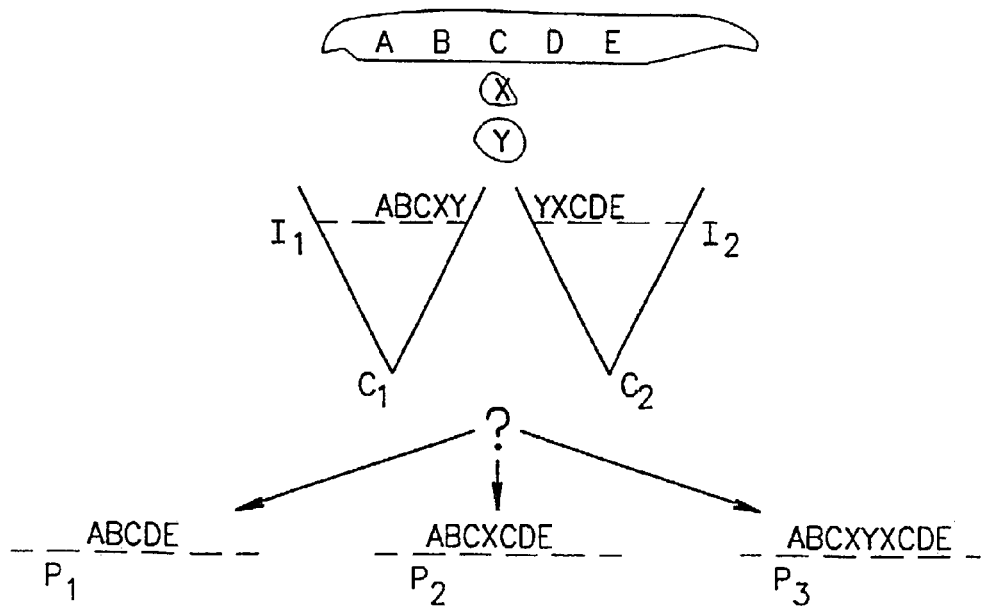
FIG. 5 shows the effects of parallax on the alignment and merging processes.

FIG. 5 shows the effects of parallax on the alignment and merging processes. Objects A, B, C, D, E are located on a planar surface at the top of the figure. Objects C, X, and Y induce parallax in the two input images $I_1$ and $I_2$ taken by a translating camera at $C_1$ and $C_2$. Either objects C, X, or Y can be used as aligned regions, thus giving three different ways to create panoramic images, shown as $P_1$, $P_2$ and $P_3$ at the bottom of the figure.

The mosaicing process can be presented as cutting "strips" from each image, and pasting those strips to a larger panorama. It will be shown that the type of camera motion determines the shape of these strips. This is in contrast to prior suggestions to use a "Voronoi Tessellation" to create the panoramic mosaic from the images, a suggestion that does not take into account at all the three-dimensional camera motion, but only the two-dimensional image displacement of the image centers.

For example, better mosaicing will result if the boundaries of the strip are taken to be approximately perpendicular to the "optical flow" (local image displacement) generated by the camera motion. Examples are camera translations: sideways motion, forward motion, and a general translation; as well as camera zoom.

Figure 6:
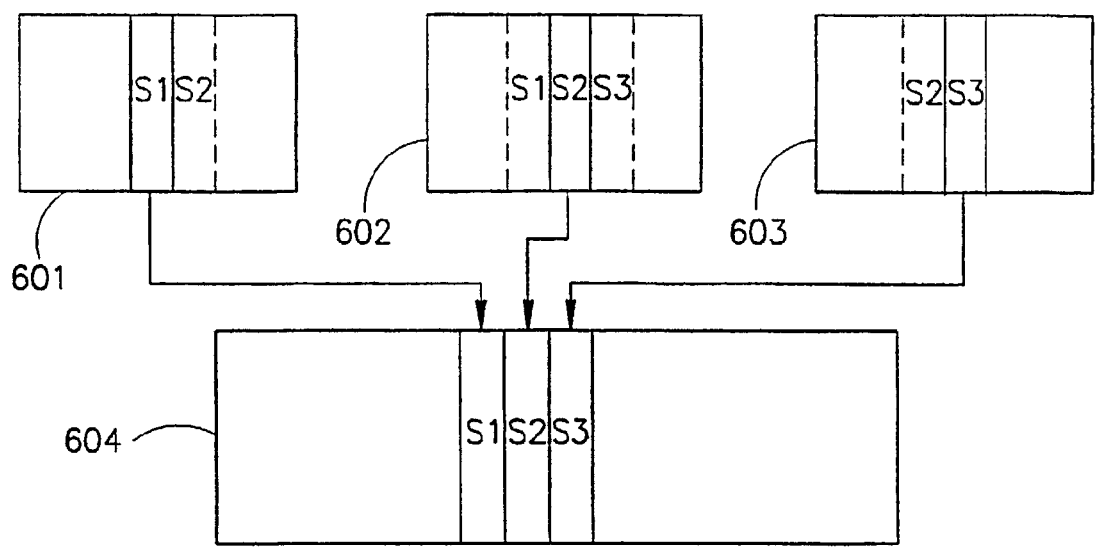
FIG. 6 shows a mosaic built from images taken by a camera in sideways motion using vertical linear strips perpendicular to the camera's optical axis and to the optical flow which is from right to left as the camera translates from left to right.

In sideways motion, as shown in FIG. 6, the strips can be linear strips at the center of the images. Given three input frames, 601, 602, and 603, panoramic mosaic 604 is generated by taking strip S1 from image 601, strip S2 from image 602, and strip S3 from image 603. The images are aligned so that region S1 in image 601 matches region S1 in image 602, region S2 in image 602 matches regions S2 in images 601 and 603, and region S3 in image 603 matches region S3 in image 602.

Figure 7A:
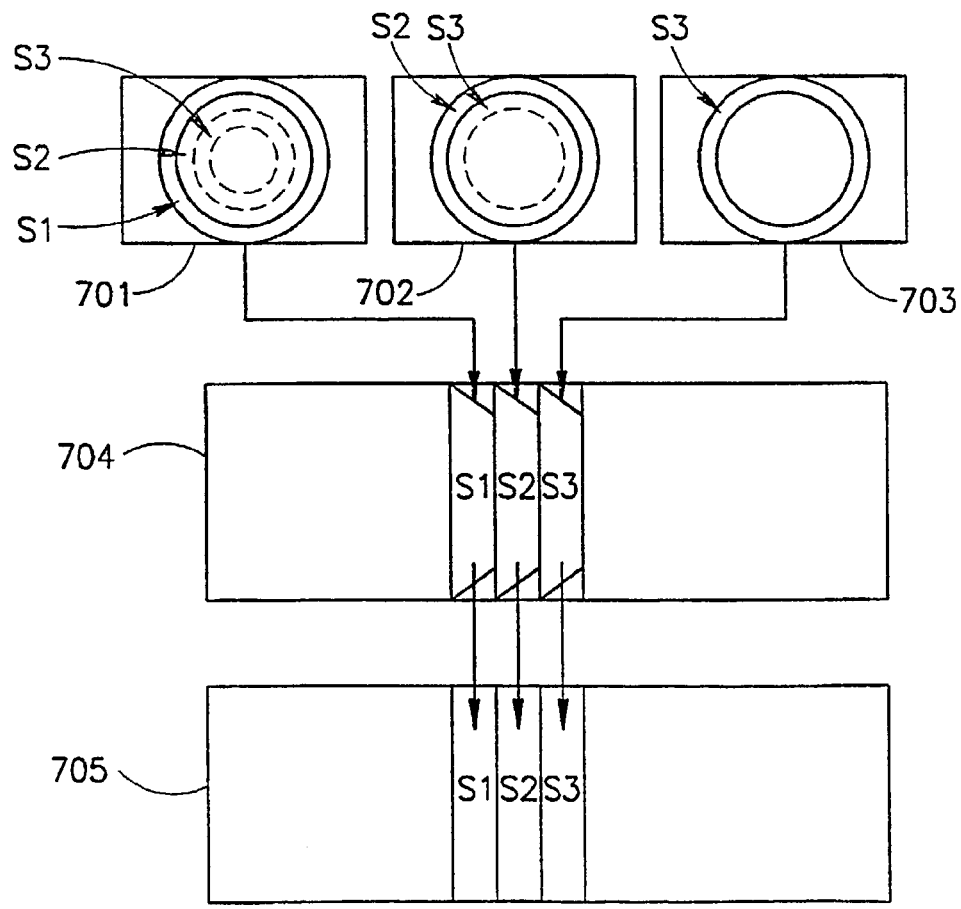
FIG. 7a shows a mosaic built from images taken by a camera in forward motion with translation along the optical axis of the camera, and optionally with zoom; the optical flow is radial from the center of the image to the outside, and the strips are circular.

In the cases of forward motion and of zoom the strips cannot be bound by straight lines. In these cases the strips are preferably circular, centered at the focus of expansion of the image. In the example shown in FIG. 7a the focus of expansion is located at the center of the image. Panoramic mosaic 704 will be created by "unfolding" strip S1 from image 701, strip S2 form image 702, and strip S3 from image 703, and placing them adjacent to each other.

When the strips are wide, "unfolding" them (by warping) will create a non-rectangular strip. Also, strips will not be aligned due to scale difference across seams. In this case each strip can be resealed to a rectangular strip, thus giving the continuous panoramic mosaic 705 from panoramic mosaic 704. Such rescaling will improve alignment across seams. The place where the circle is "opened" before its unfolding is arbitrary, and possibly determined by the direction in which the panoramic mosaic is constructed. The constructed mosaic image can be considered as the surface area of a cylinder as will be described in greater detail below with reference to the three-dimensional interpretation of the method.

It should be noted that the "unfolding" of the circular strips into straight strips might cause mosaic 705 to look distorted. It is expected that only sub-parts will be used from such mosaics, for example the part that relates to the top of the image or the part that relates to the left side of the image, etc. Such a part will usually be a rectangular sub-strip of mosaic 705. Before such a part is displayed the mosaic can be rectified by "bending" its straight sides into arcs of a circle whose radius, for example, can be the outside radius of the original circular strip (e.g. strip S3 in image 703).

Figure 7B:
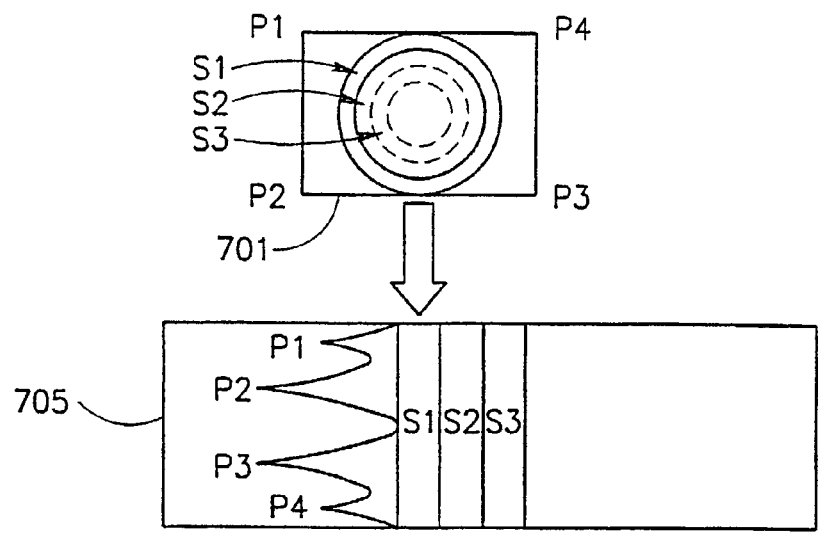
FIG. 7b shows the result of applying to an entire image the transformation that "bends" the strips.

The transformation that mapped strip S1 in image 701 into strip S1 in mosaic 705 turns radial optical flow, in image 701, into parallel optical flow, in image 705. If the same transformation is applied to the entire image 701, instead of just to strip S1, the transformed image will have the shape shown in FIG. 7b. As will be described in greater detail below, such transformations can be modeled by the three-dimensional interpretation using the projection onto a cylinder.

The case of camera zoom is of special interest. Whilst zooming towards a distant scene, and mosaicing as in FIG. 7a will create a mosaic image with higher resolution in locations relating to the center of the image, the case of a camera viewing objects from the side is different. Assume the camera is located at the side of a very long wall, with the optical axis parallel to the wall. In this case the closest parts of the wall are seen in great detail at the edge of the image, while the distant parts of the wall are seen smaller closer to the center of the image. When zooming in, the further parts are magnified and get closer to the edge of the image, and the mosaic will therefore become a reconstruction of the wall at the highest possible resolution. Under some conditions the wall can even be reconstructed as viewed from the front, with uniform resolution all over.

Figure 8:
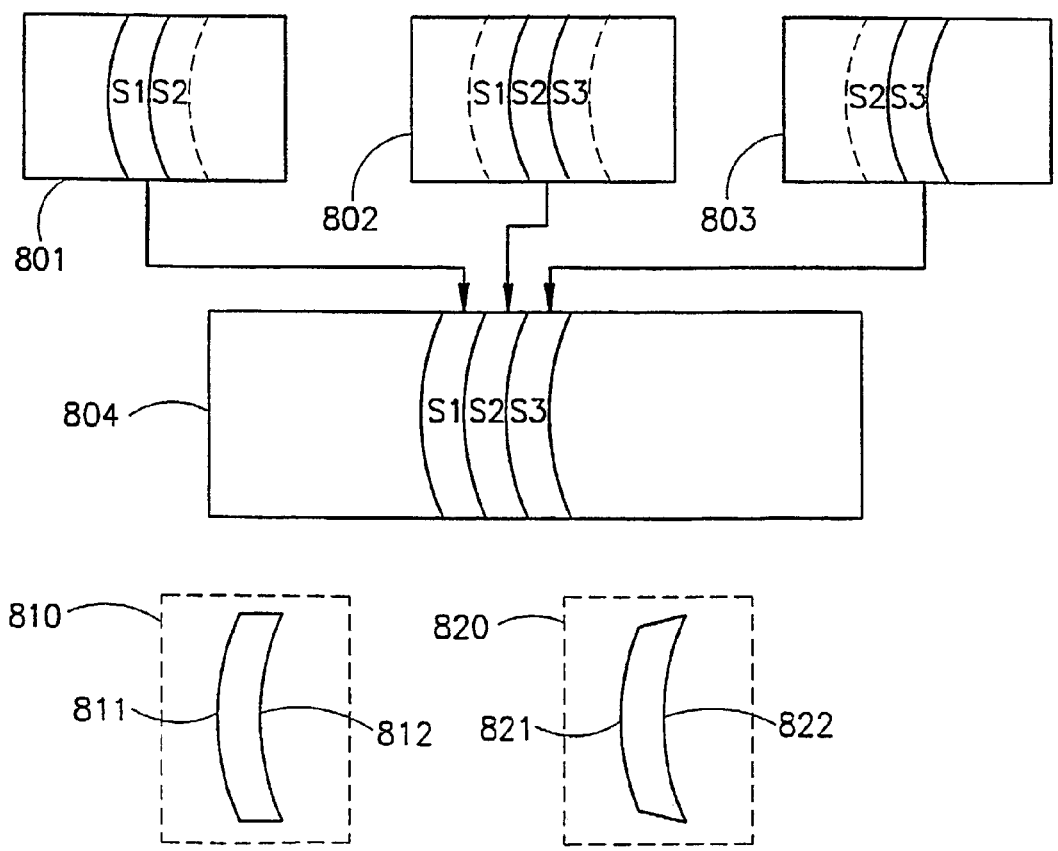
FIG. 8 shows a mosaic built from images taken by a camera in translation from left to right along a line making an intermediate angle (between 0 and 90 degrees) with the optical axis; the optical flow is radial from the focus of expansion which is located to the right of the image, and the strips are circular or elliptic arcs.

In a more general case of camera translation, shown in FIG. 8, there can be any angle between the direction of camera motion and the optical axis. In this example the optical flow can be radial from the focus of expansion, which is located somewhere outside the image, and therefore the preferred shape for the strip is a circular or an elliptic arc. Given three input frames, 801, 802, and 803, panoramic mosaic 804 is generated by taking strip S1 from image 801, strip S2 from image 802, and strip S3 from image 803. The images are aligned so that strip S1 in image 801 matches strip S1 in image 802, strip S2 in image 802 matches strips S2 in images 801 and 803, and strip S3 in image 803 matches strip S3 in image 802.

The strips in the input images, like strip S1 in image 801 and strip S2 in image 802, are bounded by arcs of concentric circles centered at the focus of expansion. Since the radii of the two circles are different, their curvatures are different, and the strips can not be pasted together without gaps forming between the edges of the strips. In order to achieve pasting the strips without the formation of gaps the strips are warped before pasting.

Strip 810 displays an example of an original circular strip as cut from an input image. The radius $r_1$ of left arc 811 is larger than the radius $r_2$ of right arc 812, which is closer to the focus of expansion. Strip 810 can be warped to yield strip 820, which has the following properties: arc 821 and arc 822 are both of radius $r_1$; the length of arc 821 is the same as the length of arc 811; the length of arc 822 is the length of arc 812 multiplied by $r_1/r_2$. This arrangement assures not only that the strips will fit without gaps, but also that features of the image will be resized properly for better alignment across the seam.

Even though the above discussion on the shape of the strip assumes a uniform camera motion along a sequence, camera motion can change, affecting the shape of the strip. Assume, for example, a forward motion between frame $I_1$ and frame $I_2$, and a sideways motion between frame $I_2$ and frame $I_3$. The strip taken from frame $I_2$ can have a circular arc boundary on the side of frame $I_1$, and a straight line boundary on the side of frame $I_3$.

EXAMPLE

Mosaicing for Affine Motion

An example of strip shaping for the special case of affine motion will now be described. Affine motion is based on an affine transformation and affords a good approximation for many types of motion. Based on the detailed description given below it will be apparent to a person skilled in the art that other types of motion can be dealt with in a similar manner.

The affine transformation can be expressed as follows:

$$\begin{pmatrix} u \\ v \end{pmatrix} = \begin{pmatrix} x_n - x_{n-1} \\ y_n - y_{n-1} \end{pmatrix} = \begin{pmatrix} a + bx_n + cy_n \\ d + ex_n + fy_n \end{pmatrix} \quad (1)$$

where $P_{n-1}=(x_{n-1}, y_{n-1})$ and $P_n=(x_n, y_n)$ are the coordinates of corresponding points in images $I_{n-1}$ and $I_n$, and the parameters of the affine transformation A are (a, b, c, d, e, j). (u, v) is the optical flow vector as a function of position ($x_n$, $y_n$). The transformation A (and the optical flow) vary continuously along the sequence of images. Numerous methods exist to recover the parameters of an affine transformation [21, 18] and they will not be described here.

In accordance with the method of the present invention, in order to define the shape of a strip, it is required to find a line F(x,y)=0 which is perpendicular to the optical flow. It should be noted that this line is not necessarily a straight line, and can be a curved line. The normal to the line F=0 is in the direction $$\left( \frac{\partial F}{\partial x}, \frac{\partial F}{\partial y} \right),$$

and thus should be in the same direction as (u, v). This constraint can be expressed as follows:

$$\begin{pmatrix} \frac{\partial F}{\partial x} \\ \frac{\partial F}{\partial y} \end{pmatrix} = k \begin{pmatrix} u \\ v \end{pmatrix} = k \begin{pmatrix} a+bx+cy \\ d+ex+fy \end{pmatrix} \quad (2)$$

for some value of k. By integrating, when e=c we get the line equation:

$$0 = F(x, y) = ax + dy + \frac{b}{2}x^2 + \frac{c+e}{2}xy + \frac{f}{2}y^2 + M \quad (3)$$

Note that this line equation exists only when e=c. In most cases, the difference between the values of c and e is due to the rotation of the image around the optical axis by ω (angle in radians), such that it contributes −ω to c, and +ω to e. To approximately satisfy the condition $$e \approx c \approx \frac{e+c}{2}$$

it is therefore possible to rotate the image about its center by $$w \approx \frac{e-c}{2}$$

after the affine transformation is recovered, and then recompute the affine transformation.

As a result, Equation 3 defines a family of lines that are all perpendicular to the optical flow. M is used to select a specific line. It is suggested that M be set equal to the value for which the line contains a maximum number of pixels within the image. If many options exist, then it is suggested that a line be selected as close as possible to the center of the image so as to minimize lens distortions. This selection should ensure that pixels used in the mosaic will be from that image having the best resolution at that location.

Figure 9A:
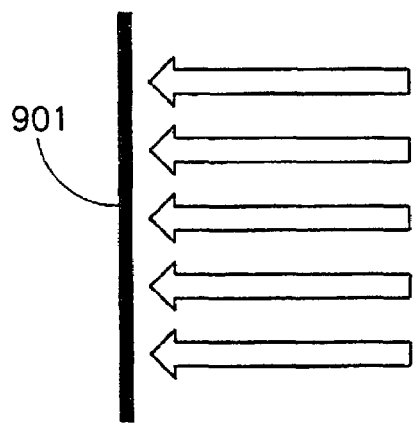
FIG. 9a a straight vertical strip for horizontal motion.

Equation 3 can be easily understood for some simple cases:

(i) In the case of a uniform horizontal optical flow (either a small pan or a sideways translation of the camera), the affine transformation A takes the form A=(a, 0, 0, 0, 0, 0), thus the selected line 901 becomes 0=F(x,y)=ax+M, which is a straight vertical line (See FIG. 9a).

Figure 9B:
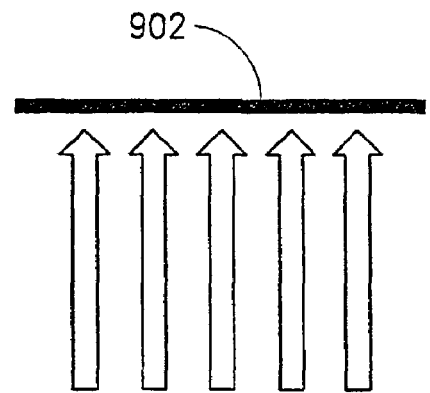
FIG. 9b a straight horizontal strip for vertical motion.

(ii) In the case of a uniform vertical optical flow (either a small tilt or a vertical translation of the camera), the affine transformation takes the form A=(0, 0, 0, d 0, 0), thus the selected line 902 becomes 0=F(x,y)=dy+M, which is a straight horizontal line (See FIG. 9b).

Figure 9C:
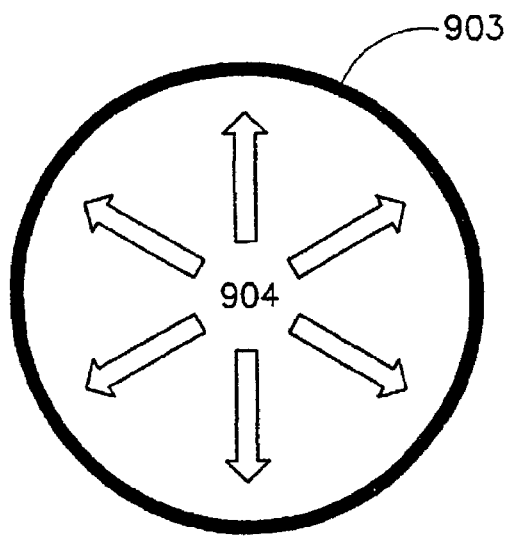
FIG. 9c a circular strip for forward motion.

(iii) In the case of zoom or forward motion (towards a planar surface which is parallel to the image plane), the affine transformation takes the form A=(0, b, 0, 0, 0, f), where b is a scaling factor (f=b). As a result, the selected line 903 becomes $$0 = F(x, y) = \frac{b}{2}(x^2 + y^2) + M,$$

which is a circle around the center of the image 904 (see FIG. 9c).

For general translations of the camera the line will be a circle around the focus of expansion. In more general cases the line may be approximated by an elliptic curve 905:

$$0 = F(x, y) = ax + dy + \frac{b}{2}x^2 + \frac{s}{2}y^2 cxy + M$$

Figure 9D:
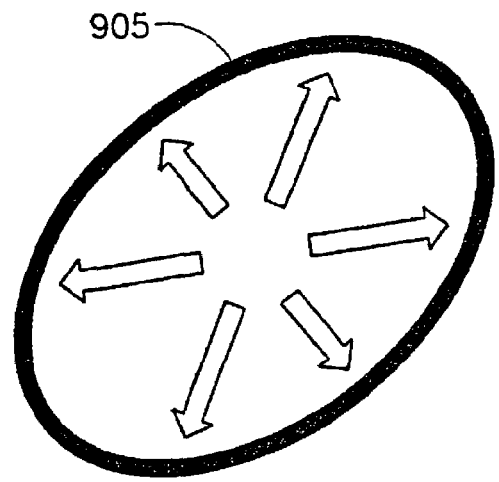
FIG. 9d an elliptical strip for general motion.

(see FIG. 9d).

The mosaic is constructed by pasting together strips taken from the original images. The shape of the strip, and its width, depend on the image motion. An example will now described of how to determine these strips in the case of an affine motion to conform to the methodology of the selection of best resolution. Strip selection for other types of image motion can be performed in a similar manner.

The following notation will be used to describe the strip collection along the sequence of images: the line $F_n(x_n, y_n)=0$ is the line in image $I_n$, in its coordinate system, which is perpendicular to the optical flow described by the affine transformation $A_n=(a_n, b_n, c_n, d_n, e_n, f_n)$. This affine transformation $A_n$ relates points $p_n$ in image $I_n$ to corresponding points $p_{n-1}$ in image $I_{n-1}$.

In order to determine the strip to be taken from image $I_n$, the preceding fame $I_{n-1}$, and the succeeding frame $I_{n+1}$, should be considered. Let $A_n$ be the affine transformation relating points $p_n=(x_n, y_n)$ in image $I_n$ to the corresponding points $p_{n-1}=(x_{n-1}, y_{n-1})$ in image $I_{n-1}$, and let $A_{n+1}$ be the affine transformation relating points $p_{n+1}=(x_{n+1}, y_{n+1})$ in image $I_{n+1}$ to the corresponding points $p_n=(x_n, y_n)$ in image $I_n$.

Figure 10:
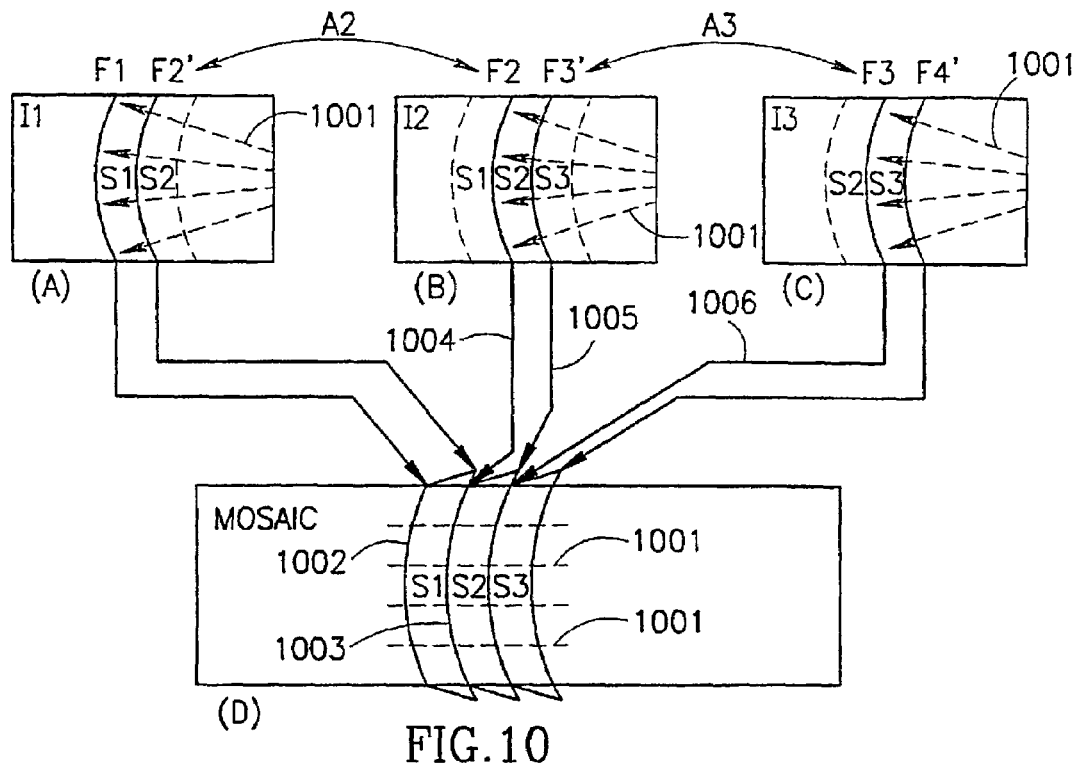
FIG. 10 show an example of cutting and pasting strips for the case of affine motion.

Given the affine transformations $A_n$ and $A_{n+1}$, the lines $F_n(x_n, y_n)=0$ and $F_{n+1}(x_{n+1}, y_{n+1})=0$ are selected respectively (see FIGS. 10a to 10c). The line $F_n(x_n, y_n)=0$ in $I_n$ corresponds to the line $F'_n(x_{n-1}, y_{n-1})=0$ in $I_{n+1}$ using the affine transformation $A_n$. In the same way, the line $F_{n+1}(x_{n+1},$ $y_{n+1})=0$ in $I_{n+1}$ corresponds to the line $F'_{n+1}(x_n, y_n)=0$ in $I_n$ using the affine transformation $A_{n+1}$.

The strip that is taken from the image $I_n$ is bounded between the two lines $F_n(x_n, y_n)=0$ and $F'_{n+1}(x_n, y_n)=0$ in $I_n$ (see FIGS. 10a to 10c.) For example, in FIG. 10b, line F2 is selected in image I2, and in FIG. 10c line F3 is selected in image I3. The mapping of line F3 (in I3) into image I2 using the affine transformation is line F3'. Hence the strip S2 taken from image I2 in FIG. 10b is bounded between lines F2 and F3'. It should be noted that the strips S1, S2, and S3 are perpendicular to the lines of optical flow 1001.

Using this selection, the first boundary of the strip will be defined by the selected line $F_n$, thus will be exactly orthogonal to the optical flow with regard to the previous image. The second boundary of the strip is defined by the line $F'_{n+1}$ which is the projection of the line $F_{n+1}$ onto the current image $I_n$, having the same property in the next image.

This selection of the boundaries of the strip ensures that no information is missed nor duplicated along the strip collection, as the orthogonality to the optical flow is retained.

Consider the common approach to mosaicing where one of the frames is used as a reference frame, and all other frames are aligned to the reference frame before pasting. In term of strips, the first strip is put in the panoramic image as is. The second strip is warped in order to match the boundaries of the first strip. The third strip is now warped to match the boundaries of the already warped second strip, etc. As a result, the mosaic image is continuous. However, major distortions may be caused by the accumulated warps and distortions. Large rotations cannot be handled, and cases such as forward motion or zoom usually cause unreasonable expansion (or shrinking) of the image.

To create continuous mosaic images while avoiding accumulated distortions, it is proposed by this invention that the warping of the strips should depend only on the adjacent original frames, independent of the history of previous distortions.

In accordance with the present invention, it is preferable that one side of each strip, e.g. the back side, is not being warped. This is the side of the strip that corresponds to the boundary between image $I_{n-1}$ and image $I_n$ and defined by $F_n$. For example, in FIG. 10b, line F2 is the back of strip S2 of image I2. The front of the strip is warped to match the back side of the next strip. This is the boundary between image $I_n$ and image $I_{n+1}$ which is defined by $F'_{n+1}$. For example, in FIG. 10b, the line F3' is the front of strip S2 of image I2.

In the example described in FIG. 10d, the first strip S1 is warped such that its left side (i.e., back side) 1002 does not change, while its right side (i.e., front side) 1003 is warped to match the left side of the original second strip S2. In the second strip S2, the left side 1004 does not change, while the right side 1005 is warped to match the left side 1006 of the third strip S3, etc.

As a result, the constructed image is continuous. Also, if the original optical flow is warped as by the same warping as that performed on the strips, the resulting flow will become approximately parallel to the direction in which the panoramic mosaic is constructed. Moreover, no accumulative distortions are encountered, as each strip is warped to match just another original strip, avoiding accumulative warps.

Possible Three-Dimensional Interpretation of Strip Shaping

In general camera motion, the optical flow is induced by camera translation and by camera rotation. The rotational part can be recovered and compensated for if needed, as it does not depend on the structure of the scene (see, for example, [17]). Camera translation (and zoom) induces radial optical flow emerging from the focus of expansion, except for the singular case of sideways translation in which the optical flow is parallel.

Cases of radial optical flow are much more complicated for mosaicing since the optical flow is not parallel, and depends on the structure of the scene.

In accordance with the present invention, an example of a possible three-dimensional interpretation of the proposed mosaicing method is presented. It is also possible to use the following description to implement the mosaicing process proposed in this invention for cases in which the three-dimensional motion information is available, either from the images [21,17] or from external devices. The procedure of choosing curved strips which are approximately perpendicular to the optical flow and warping them to match each other when pasting, can be considered as transforming the video sequence of images by an oblique projection of the image onto a viewing pipe whose central axis is defined by the trajectory of the camera. After this transformation the optical flow between the projected images becomes approximately parallel to the central axis of the pipe, and they can be easily mosaiced using simple (traditional) strip cut and paste procedures along the pipe. The pipe mosaic generated this way includes most details observed by the moving camera, where each region is taken from that image where it was captured at highest resolution, thus forming a strip in that image.

In order to define the projection onto the pipe, the following notation will be used: the letter O will be used to refer to the origin of two Cartesian coordinate systems having a joint origin. One coordinate system is a global coordinate system with axes denoted by X, Y, Z. The camera is located at the origin, and the image plane is located at $Z=f_c$, where $f_c$ is the focal length. The other coordinate system defines the pipe, and will be described below. The position of a point P in three-dimensional space is given by its coordinates in either of the coordinate systems, for example $P=(P_x, P_y, P_z)$ in the X, Y, Z coordinate system. The vector $\overline{OP}$ will also be denoted by the letter P.

Figure 11:
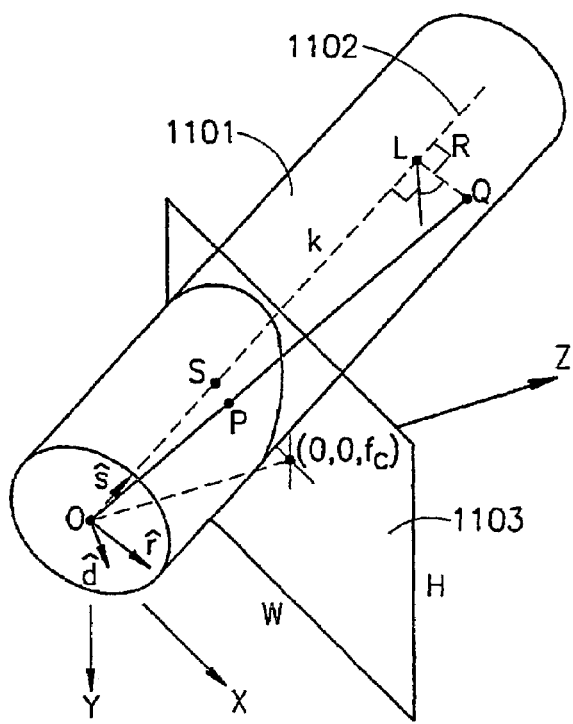
FIG. 11 shows the projection of an image onto a pipe in order to achieve parallel optical flow.

Given a sequence of images taken by a translating camera, the method of the invention suggests that the images be transformed in such a way that the radial optical flow be turned into approximately parallel optical flow in the transformed representation. In order to achieve the required transformation the two-dimensional planar image is projected onto a three-dimensional cylinder, referred to herein as a "pipe" 1101 (see FIG. 11). The axis of the pipe 1102 is chosen to pass through the optical center O=(0, 0, 0) of the camera and through the focus of expansion $S=(s_x, s_y, f_c)$, where $f_c$ is the focal length. This axis is the trajectory from the current three-dimensional camera position towards the three-dimensional camera position in the next frame. The direction of the pipe's axis is given by the unit vector $$\hat{s} = \frac{S}{|S|}.$$

Each image point $P=(x, y, f_c)$, in image plan 1103, is projected onto its corresponding point Q on the pipe. The point Q is collinear with O and P, and its distance from the pipe's axis 1102 is R (the radius of the pipe).

In the pipe representation of the image, the optical flow of each corresponding point Q on the pipe is now approximately parallel to the direction to of the pipe's axis ŝ (1102). This enables a simple mosaicing process on the pipe itself, as subsequent images, after being projected on the pipe, need only be shifted along the pipe in order to become aligned with previous images. This translation along the pipe does not reduce the resolution, as commonly happens in mosaicing methods which are based on alignment with a reference frame.

A pipe-fixed Cartesian coordinate system is defined by the three unit vectors r̂, d̂ and ŝ, where ŝ is the unit vector in the direction of the pipe's axis and r̂ and d̂ are chosen to be perpendicular to each other and to ŝ.

Let the point L be the projection of the point Q on the axis 1102 of pipe 1101 and let k be the distance of L from O. The angle α designates the angle between the line joining L and Q and the unit vector d̂. Hence k and α determine the position of a point Q on pipe 1101. The three-dimensional position of a point Q on the pipe 1101, is given by the Cartesian components $(Q_x, Q_y, Q_z)$, which can be obtained from the components of the vector Q=kŝ−R cos (α)d̂−R sin (α)r̂, with respect to the pipe-fixed system. The corresponding pixel in image plane 1103 for the point Q is P=(x, y, $f_c$)=($f_c Q_x/Q_z, f_c Q_y/Q_z, f_c$).

Pixels in the image plane 1103 whose original distance from the axis 1102 is less than R become modified on the pipe, but when projected back to the image they restore their resolution. However, pixels with distance greater than R shrink on the pipe, thus loosing their original resolution. For this reason, it is recommended to choose R to be equal to $$\sqrt{f_c^2 + \left(\frac{w}{2}\right)^2 + \left(\frac{h}{2}\right)^2},$$

where w and h are the width and height of the image, thus ensuring that no pixel will have reduced resolution when projected onto the pipe. Alternatively, in many simple scenarios it is enough to choose R to be equal to $f_c$.

Figure 12A:
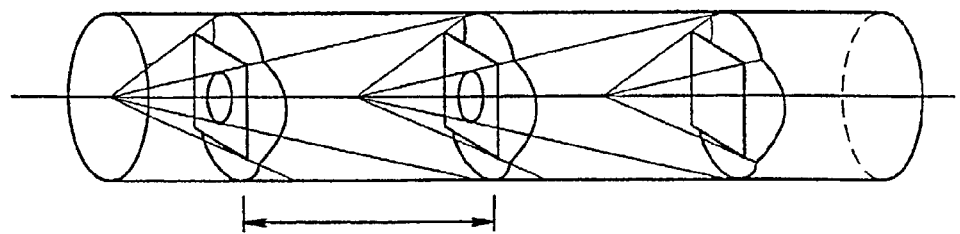
FIG. 12a shows the selection of strips from different images according to the resolution obtained from each image when projecting the images onto a pipe.

In the pipe representation, pipe images are aligned with each other by a simple translation (shift) along the pipe's principal axis, and the creation of the pipe mosaic involves taking the pixels with the best resolution among all projected images for every point on the pipe. It should be noted that other approaches to select the value for each point on the pipe could be used, including super resolution methods. The resolution is best preserved for pixels whose area when projected on the pipe is 1 by 1 pixels (meaning a single pixel is projected onto a single pixel on the pipe, without artificial scaling). Using this criteria, the ratio between the area consumed on the pipe and the area on the original image fame can be considered as a measure such that the resolution is preserved best when this ration is as close as possible to 1. As a result, for each point on the pipe, its corresponding pixels in the images are considered, and the one with the ratio closest to 1 may be chosen for best resolution. As a rule of thumb, this ratio can be roughly approximated according to the ratio of the distances along the Z axis $Q_z/f_c$, which should be as close as possible to 1. Using this approximated measure, pixels on the image at the intersection of the pipe with the image ($Q_z=f_c$) are considered as best preserving the resolution, and the resolution preservation decreases according to $|Q_z-f_c|$. For every point on the pipe the image values (e.g. color and intensity) will be taken from the image in which the value of $|Q_z-f_c|$ is minimal, thus having best resolution preservation. This definition forms a strip in every image, which is the region in which this image best maintains the resolution when projected on the pipe, compared to the corresponding regions in other images (See FIG. 12*a*).

This pipe representation proposes a generalized interpretation also for the traditional mosaicing methods. Methods based on alignment to a reference frame can be simulated by viewing the pipe from the same orientation as the selected reference frame. Methods which are limited to pure sideways translation will give identical results as using a pipe mosaic, where the images are projected on the side of the pipe.

Cases like oblique view, forward motion, and zoom, can be well defined using the pipe projection, and give optimal results, while, previous mosaicing methods may fail in these cases. The mosaicing process covered by this invention uses generalized strips (having their shape, size, and warping process determined according to the motion, and resolution considerations), and may be interpreted by the above description of pipe mosaicing, thus generalizing the known methods to work for the problematic cases as well.

Figure 12B:
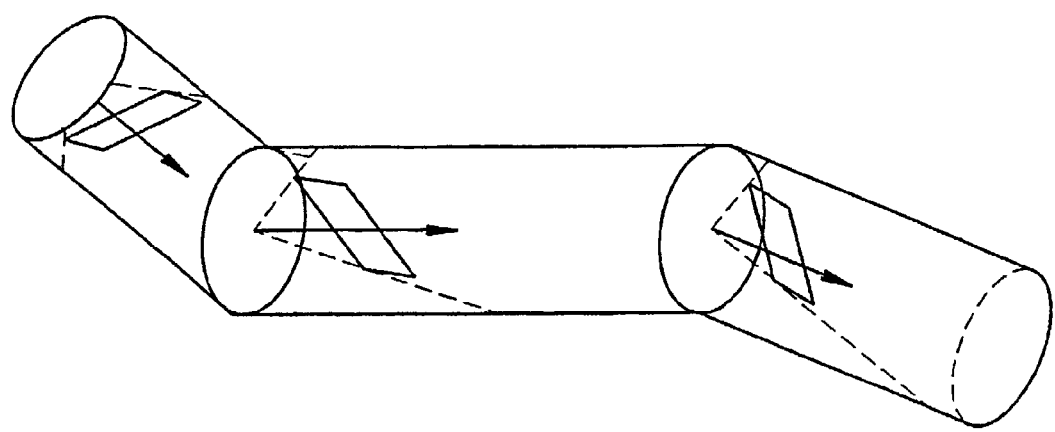
FIG. 12b shows the concatenation of pipes in the case of complex camera path.

The pipe representation can be generalized for handling complicated trajectories and rotations by concatenation of pipes along the path of the camera (See FIG. 12*b*).

Strip Width in Three-Dimensional Representation

When the three dimensional camera motion T=($T_X, T_Y, T_Z$) and =(x, y, z) (translation and rotation) is available from external devices, or by using algorithms for camera motion recovery from the images [21,17], then either of these could be used for setting the size of the strips.

Following the description of the mosaicing process using the "pipe", the projections of two images onto the pipe can be aligned with each other by simple shift along the pipe's axis. Shifting the projected image by L pixels can form a strip with a width of L pixels. A method to approximate the width, L, of a strip for two input frames will now be described.

Note that it is assumed in this section that the pipe's radius is chosen to be R=$f_c$, although other values of R are possible, and the value of L may be scaled accordingly.

It is required to compute the width of the strip, L, in such a way that the resolution of the resulting panoramic image will be no less than the resolution of the original sequence of images. For example, without parallax, the width of the strip can be equal to image displacement between the two frames.

Figure 13:
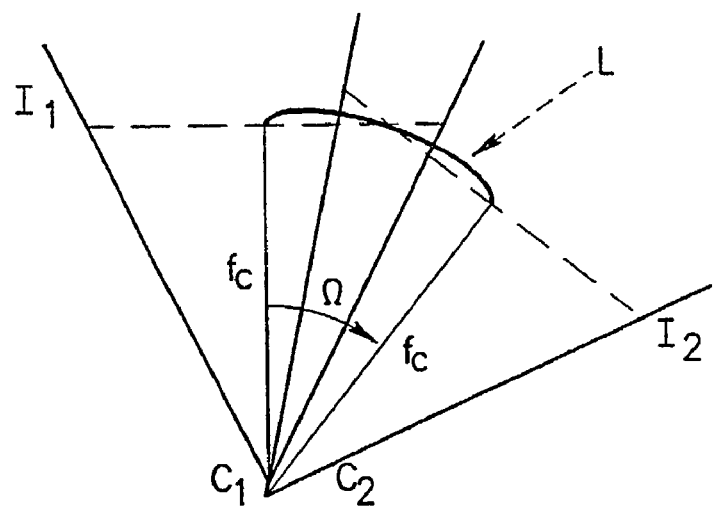
FIG. 13 shows the choice of strip width required to preserve the original resolution for the case of pure rotation.

FIG. 13 shows the choice of strip width required to preserve the original resolution for the case of pure rotation. The width of the strip L from the center of image $I_1$ to the center of $I_2$ can be set to L=|Ω×(0,0,$f_c$)$^t$|=$f_c\sqrt{\Omega^2_x+\Omega^2_y}$, where $f_c$ is the focal length of the camera (or the pipe's radius), × is the cross product operator, and ( )$^t$ is the transpose operator. This will give similar results as in other panoramic mosaicing methods restricted to pure rotation.

Figure 14:
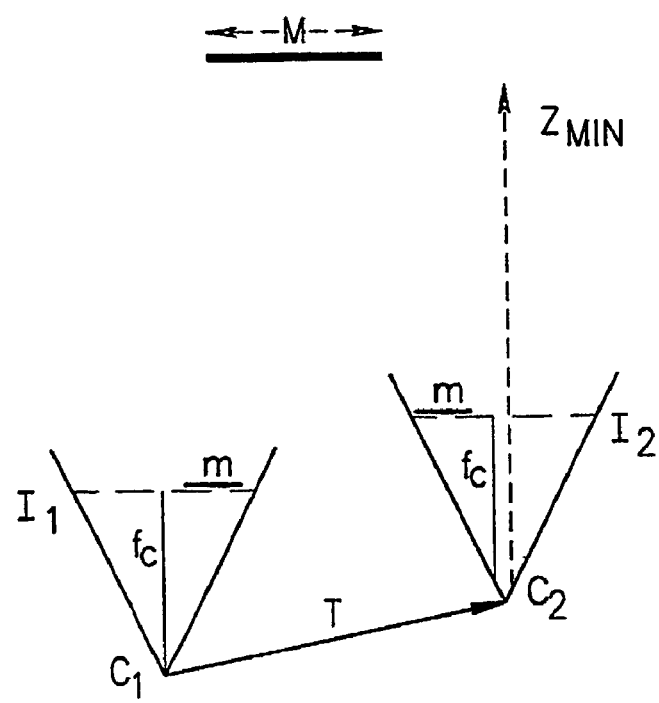
FIG. 14 shows the choice of strip width required to preserve the original resolution for the case of pure translation.

FIG. 14 shows the choice of strip width required to preserve the original resolution for the case of pure translation. In the case of pure translation, it would be best if the result has the same effect as that of orthographic projection (parallax independent). It is therefor suggested that the resolution of the resulting image is considered in such away that all objects whose distance from the camera is at least $Z_{min}$ will maintain or improve their resolution. $Z_{min}$ can be defined according to the application, and in general, corresponds to the closest object, having the largest image (or pipe) displacement.

For example, FIG. 14 describes a scene with objects that are not closer to the camera than some distance $Z_{min}$. An object of length M, will have at most $m=f_cM/Z_{min}$ pixels in the image plane, where $f_c$ is the focal length of the camera. Consider a camera translating with |T|=M, such that the center of the first image looks at one end of the object, and the center of the second image looks at the other end of the object. This means that the camera has just passed that object from one end to the other, thus L=m pixels are required in between in order to preserve the object's original resolution in the panoramic image. As a result, the following the definition $L=f_c|T|/Z_{min}$ for the width of a strip is proposed for the case of pure translation, where $f_c$ is the focal length (or the pipe's radios). A strip whose width is at least L pixels can be used for the creation of the panoramic image (or some narrower strips, such as L strips from L intermediate views, where each is one pixel wide, as will described later) This definition can cause all objects at a distance $Z>Z_{min}$ to have better resolution than in the original sequence of images.

In the case of general motion, the width of the strip L between $I_1$ and $I_2$ can be directly determined from $f_c$ (the focal length), T (the translation vector) and $\Omega$ (the rotation vector). For example, the following equation can be used:

$$L=f_c|T|/Z_{min}+\Omega\times(0,0,1)'$$

Note that T and Z can usually be recovered only up to a scale factor, but the relation between them can be recovered uniquely. The term $f_c|T|/Z_{min}$ defines the maximum magnitude of optical flow induced by camera translation, which is recoverable. This definition does not depend on any one specific region in the image, and depends only on the camera motion parameters, thus it is consistent along the sequence of images, and enables the creation of realistic panoramic mosaics.

Mosaicing Using New View Generation

In order to create a manifold projection, the images are considered to be a one-dimensional (not necessarily linear) scan of the scene, which is a collection of strips that are approximately perpendicular to the direction of the camera motion.

Taking strips from different images with strip widths of more than one pixel works fine only if there is no parallax. For the general case that includes parallax, instead of taking a strip with a width of L pixels, intermediate images can be synthetically generated, and narrower strips can be used. For example, a collection of L strips, each with a width of one pixel, can be taken from interpolated views in between the original camera positions.

Figure 15:
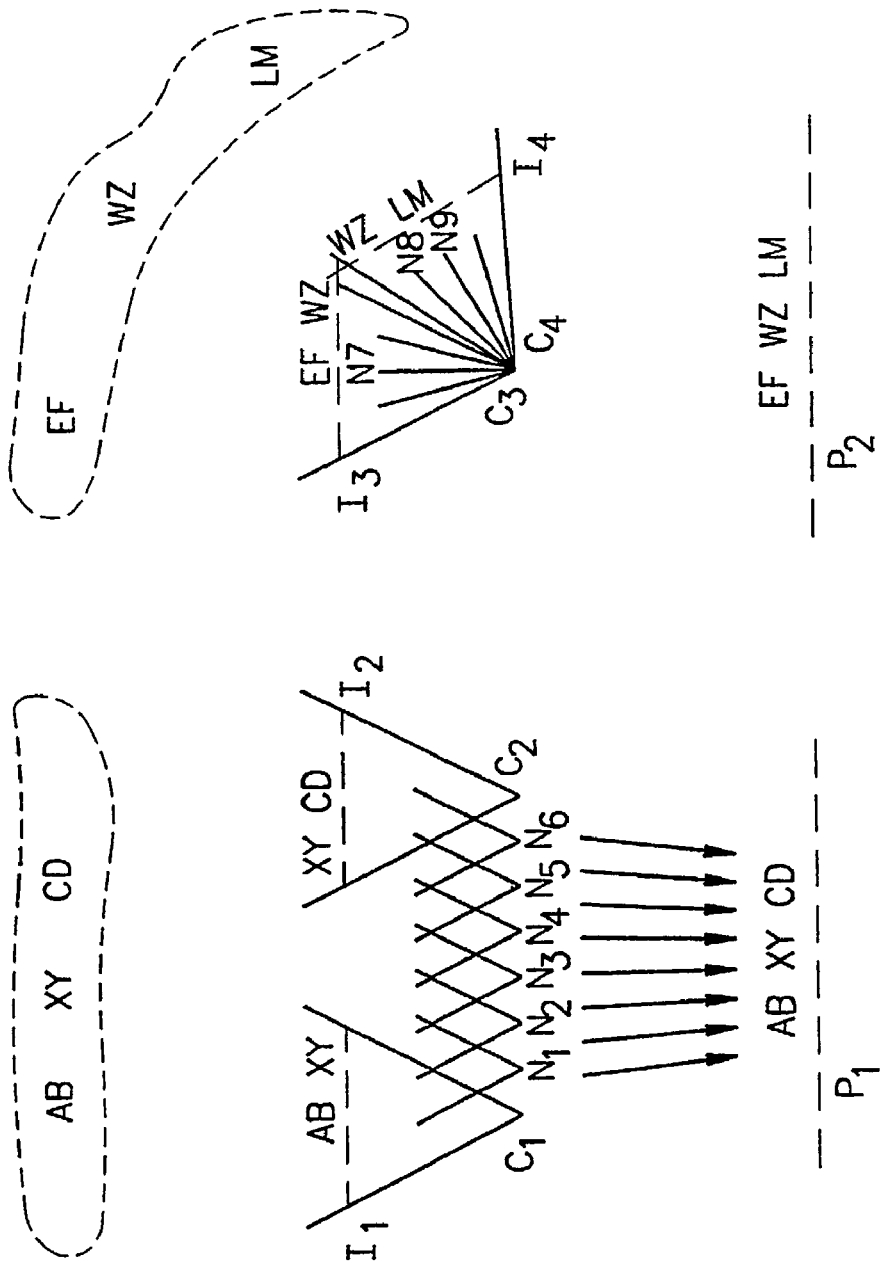
FIG. 15 shows the generation of a panoramic image using view interpolation by generating synthetic views from intermediate camera positions and by taking narrow strips from each intermediate view to construct the mosaic; for either the case of translation, $P_1$, or for the case of rotation, $P_2$.

FIG. 15 shows the generation of a panoramic image using view interpolation by generating synthetic views from intermediate camera positions for two examples, one for the case of translation, and one for the case of rotation. In the case of translation, the objects A, B, X, Y, C, D are viewable in the two subsequent frames $I_1$ and $I_2$, taken by a camera which is translating from position $C_1$ to position $C_2$. All intermediate images required are recovered, for the in between views $N_1$, $N_2$, . . . , and a single strip (one pixel wide) is taken from each intermediate image. The process of generating these intermediate views, and collecting of these strips gives as a result the panoramic mosaic $P_1$. This panorama is realistic, and does not suffer from parallax effects.

The same mechanism applies also for the case of rotation. Here, the objects E, F, W, Z, L, M are viewable in the two subsequent frames $I_3$ and $I_4$, taken by a camera whose location is fixed, and whose orientation changes from $C_3$ to $C_4$. All intermediate images required are recovered for the in between views $N_7$, $N_8$, . . . , and a narrow strip is taken from each intermediate image. The result of this process is the panoramic mosaic $P_2$. This panorama is as good as the panorama created by some previous methods, as no parallax effects are encountered in pure rotation.

In order to synthesize new views various known methods can be used, such as Optical Flow interpolation [6, 19], Trilinear tensor methods [17], and others. In most cases approximate methods will give good results. The creation of the intermediate views should require only view interpolation, since in most applications view extrapolation is not required.

Figure 16:
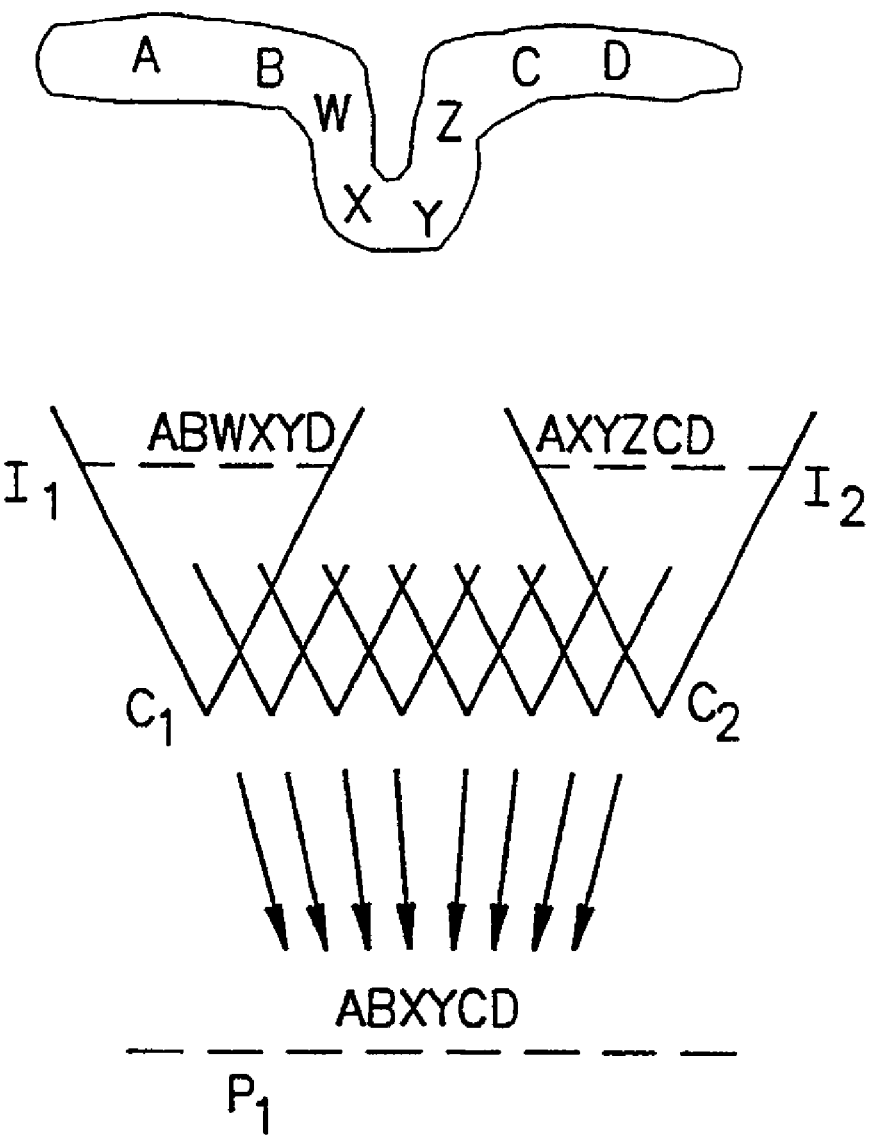
FIG. 16 shows the generation of consistent panoramic mosaics in the presence of parallax.

The use of intermediate views for strip collection gives the effect of orthographic projection, which avoids parallax discontinuities. For example, FIG. 16 shows the generation of consistent panoramic mosaics in the presence of parallax. The method described above overcomes the difficulties of parallax using view interpolation, and the result remains realistic.

Although the present invention has been described to a certain degree of particularity, it should be understood that various alterations and modifications could be made without departing from the spirit or scope of the invention as hereinafter claimed.

What is claimed is:

1. In a method of combining a sequence of two-dimensional images of a scene to construct a panoramic mosaic of said scene, said sequence of images being acquired by moving a camera for relative motion with respect to said scene, said relative motion giving rise to an optical flow between said images, wherein at least part of said optical flow includes optical flow vectors that are mutually unparallel, the improvements comprising:

a) warping said images so that said optical flow vectors become substantially parallel to each other and to a direction in which said panoramic mosaic is constructed; and b) pasting said warped images so that said sequence of two-dimensional images is continuous for said scene.

2. The method of claim 1 wherein the two-dimensional images are related by a transformation which is substantially an affine transformation or a planar-projective transformation.

3. The method of claim 1 wherein said images are projected onto a three-dimensional cylinder whose major axis approximates the path of camera optical center, a combination of the images being achieved by translating the projected two-dimensional images substantially along the cylindrical surface of the three-dimensional cylinder.

4. The method according to claim 1, wherein a transformation is applied to the panoramic mosaic depending on a desired viewpoint.

5. The method according to claim 1, wherein the sequence of images is augmented by sets of interpolated images intermediate to the images of the sequence of images, and wherein the images are augmented with images defined on the interpolated images.

6. A system for combining a sequence of two-dimensional images of a scene to construct a panoramic mosaic of said scene, said sequence of images being acquired by a moving camera in a relative motion with respect to said scene, said relative motion giving rise to an optical flow between the images, wherein at least a part of the optical flow includes optical flow vectors is that are mutually unparallel, the system comprising:

a warper for warping said images so that the direction of said optical flow vectors becomes substantially parallel to each other and to a direction in which said mosaic is constructed; and a paster for pasting said warped images so that said sequence of two-dimensional images is continuous for said scene.

7. A memory containing a file representing a panoramic mosaic of a scene generated by the method of claim 1.

8. A computer program product comprising a computer useable medium having computer readable program code embodied therein for combining a sequence of two-dimensional images of a scene to construct a panoramic mosaic of said scene, said sequence of images being acquired by a moving camera in a relative motion with respect to said scene, said relative motion giving rise to an optical flow between the images, wherein at least a part of the optical flow includes optical flow vectors that are mutually unparallel, the computer program product comprising:

computer readable program code for causing the computer to wrap said images so that the direction of said optical flow vectors becomes substantially parallel to each other and to a direction in which said mosaic is constructed; and computer readable program code for causing the computer to paste said wraped images so that said sequence of two-dimensional images is continuous for said scene.

9. Use of the method of claim 1 for handling at least one case from the group consisting of image parallax, camera zoom, forward camera motion, and general camera motion combining translation and rotation.

10. The method of claim 1, further comprising storing in a memory data representative of the panoramic mosaic of the scene.

11. A program storage device readable by machine, tangibly embodying a program of instructions executable by the machine to perform a method for combining a sequence of two-dimensional images of a scene to construct a panoramic mosaic of said scene, said sequence of images being acquired by a moving camera in a relative motion with respect to said scene, said relative motion giving rise to an optical flow between the images, wherein at least a part of the optical flow includes optical flow vectors that are mutually unparallel, the method comprising:

a) warping said images so that the direction of said optical flow vectors becomes substantially parallel to each other and to a direction in which said mosaic is constructed; and b) pasting said warped images so that said sequence of two-dimensional images is continuous for said scene.

* * * * *